United States Patent [19]

Tomita et al.

[11] Patent Number: 4,918,462

[45] Date of Patent: Apr. 17, 1990

[54] METHOD AND APPARATUS FOR DRIVING A SOLID SCAN TYPE RECORDING HEAD

[75] Inventors: Satoru Tomita, Yokohama; Kazuyuki Shimada, Tokyo; Chiaki Taniguchi, Kawasaki, all of Japan

[73] Assignee: Ricoh Company, Ltd., Tokyo, Japan

[21] Appl. No.: 337,964

[22] Filed: Apr. 13, 1989

[30] Foreign Application Priority Data

Apr. 14, 1988 [JP] Japan .................................. 63-92091

[51] Int. Cl.⁴ ......................... G01D 9/42; G01D 15/06
[52] U.S. Cl. .................................. 346/107 R; 346/160
[58] Field of Search .................. 346/107 R, 108, 160; 358/296, 300, 302; 355/1, 67, 69, 70

[56] References Cited

U.S. PATENT DOCUMENTS

| | | | |
|---|---|---|---|
| 4,370,666 | 1/1983 | Noda | 346/76 PH |
| 4,573,058 | 2/1986 | Brooks | 346/76 PH |
| 4,596,995 | 6/1986 | Yamakawa | 346/160 |
| 4,712,116 | 12/1987 | Reinten | 346/107 R |
| 4,727,428 | 2/1988 | Futatsugi | 346/107 R |
| 4,780,731 | 10/1988 | Creutzmann | 346/107 R |
| 4,835,549 | 5/1989 | Samejima | 346/107 R |
| 4,837,587 | 6/1989 | NG | 346/108 |
| 4,855,760 | 8/1989 | Kanayama | 346/107 R |

FOREIGN PATENT DOCUMENTS 62-241469 10/1987 Japan .

Primary Examiner—Bruce A. Reynolds
Assistant Examiner—Scott A. Rogers
Attorney, Agent, or Firm—Oblon, Spivak, McClelland, Maier & Neustadt

[57] ABSTRACT

A method for driving a solid scan type recording head having a plurality of elements having a function such as light emission, exothermic and discharge, includes the following procedures. A plurality of pulse signals different from each other in one of a frequency and duty ratio thereof over a fixed time, are generated depending on a difference in characteristics of the plurality of elements. Each of the pulse signals varies in level so as to rise the power level of the related element in a rise response characteristic thereof before the power level of the related element completely falls to zero in accordance with a fall response characteristic thereof. Then one of the plurality of pulse signals for each of the plurality of elements is selected depending on the characteristic of the element of concern. Thereby, a driving signal for each of the plurality of elements is generated from the corresponding selected one of the plurality of pulse signals and corresponding image data. The driving signal is supplied to the corresponding one of the elements. An apparatus for driving a solid scan type recording head is provided.

20 Claims, 6 Drawing Sheets

FIG. 1
PRIOR ART
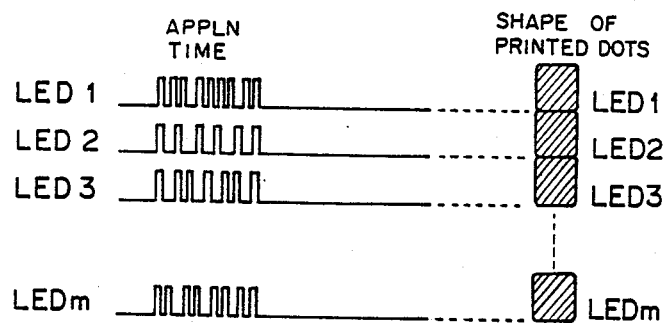
FIG. 2A
PRIOR ART
FIG. 2B
PRIOR ART
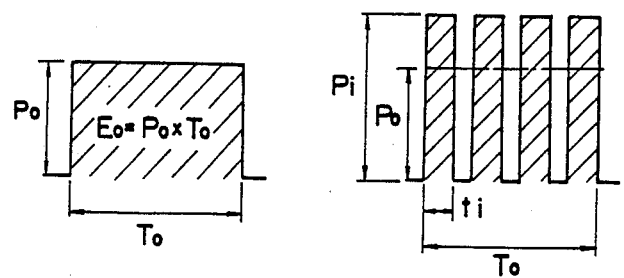

FIG. 3A
FIG. 3B
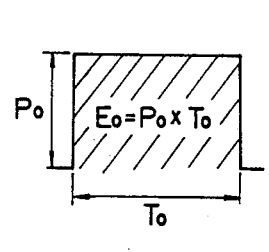
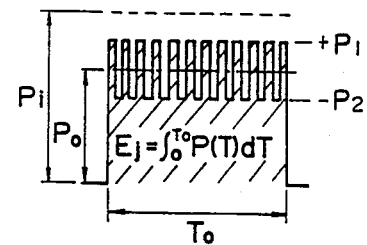
FIG. 4A
FIG. 4B
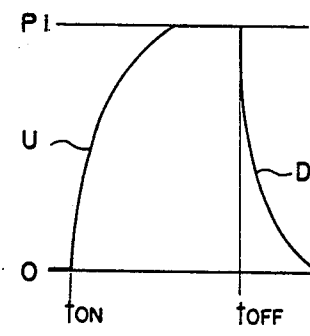
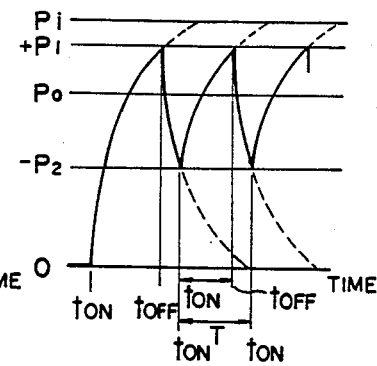
FIG. 5
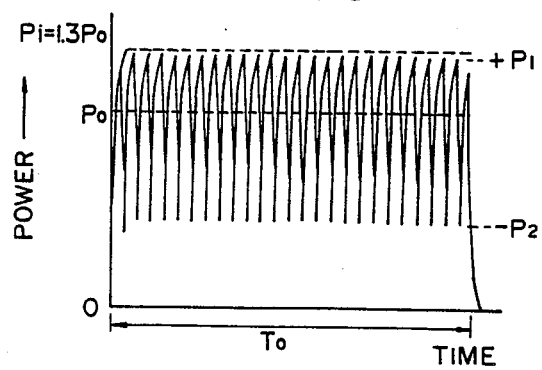

METHOD AND APPARATUS FOR DRIVING A SOLID SCAN TYPE RECORDING HEAD

BACKGROUND OF THE INVENTION

The present invention generally relates to a method and apparatus for driving a solid scan type recording head, and more particularly to a method and apparatus for driving a solid scan type recording head in which a plurality of elements having a function of having light emission, exothermic or discharge are arrayed.

Currently, there is known a solid scan type recording head such as an optical recording (multi-stylus) head, a thermal head, and an electrostatic recording head. Examples of an optical recording head are a light emitting diode array (an LED array), a liquid shutter array, and a fluorescent dot array. As a thermal head, welding coloring type and thermal image transfer type are known.

Generally, there is the difference in characteristics such as recording power (a dose of exposure) among manufactured solid scan type recording heads. Additionally, there is a difference in characteristics of focusing elements arranged in a focusing element array used for focusing light emitted from each focusing element. For these reasons, unevenness occurs in recording quality in case where each element is driven by the same driving control. From this viewpoint, an improved driving method has been proposed, in which a printing time (drive time) is changed for every element. However, the shape of recorded dot images is uneven due to the difference in printing time, and therefore ununiformity of recording occurs.

In order to eliminate the above-mentioned problem, a further improved method has been proposed in Japanese Laid-Open Patent Application No. 62-241469. In the proposed method, a voltage or current application time for each element (an LED, for example) is defined by a plurality of reference pulses arranged over a fixed time, and voltage or current is applied to each element over the identical fixed time.

This is further described with reference to FIGS. 1, 2A and 2B. In a case where m light emitting diodes LED1 through LEDm are driven, a plurality of reference pulses are suitably arranged over a fixed application time To (a write time amounting to one dot with respect to the same exposure line) with respect to each of the LEDs. Thereby, exposure energy over the application time To is made fixed with respect to each of the LEDs. For example, a small number of reference pulses is given the LED2 which has a large amount of emission power, while a large number of reference pulses is given the LED1 and LEDm, each of which has a small amount of emission power. As a result, it is possible to obtain the even dot shape depending on the application time To. The above-mentioned proposal can reduce unevenness of the shape of printed dots over the entire line to some extent.

Referring to FIG.2A, Eo is an amount of energy obtained when exposing a light emitting element having an ideal emission power level Po over a time To, that is, ti $Eo = Po \times To$. FIG.2B relates to the i-th element having an emission power level Pi ($Pi > Po$). The i-th element is exposed in such a manner that N reference pulses each having a pulse duration time ti are intermittently applied to the i-th element. An amount of exposure energy Ei obtained at this time corresponds to a value obtained by integrating hatched areas shown in FIG.2B, that is, $Ei = Pi \times ti \times N$.

A number of reference pulses N to be arranged over the fixed time To is calculated by the following formula so as to select exposure energy Ei so as to be identical to ideal energy Eo and thereby eliminate the difference in exposure energy Ei between adjacent dots:

$$N = Eo/(Pi \times ti) = (Po \times To)/(Pi \times ti)$$

However, even with the proposed method, there is a possibility that the unevenness in density among the elements may occur. As is illustrated in FIG.2B, a portion having emission power Pi and a portion having emission power Po are alternately arranged over the fixed time To corresponding to one dot. The repetition depends on the emission power Pi of an element of concern, and there exists a small exposure energy distribution over time To at a subliminal level. Therefore, ununiformity in density distribution in one dot occurs. Those examples are the distribution of a latent image potential on a photosensitive medium, distribution of adhesive toner quantity after developing, distribution of density of image on an image transferred paper obtained after transferring and fixing images. The above-mentioned ununiformity of density in one dot causes unevenness in printed images and deteriorates recording quality, particularly in high-quality recording and graphics mode.

SUMMARY OF THE INVENTION

It is therefore a general object of the present invention to provide a novel and useful method and apparatus for driving a solid scan type recording head in which the aforementioned disadvantages are eliminated.

A more specific object of the present invention is to provide a method and apparatus for driving a solid scan type recording head capable of generating the even print dot shape by each element and reducing the difference in density in a fine area corresponding to one dot.

The above objects of the present invention can be achieved by a method for driving a solid scan type recording head having a plurality of elements having a function such as light emission, exothermic and discharge, comprising the steps of generating a plurality of pulse signals different from each other in one of a frequency and duty ratio thereof over a fixed time, depending on a difference in characteristics of the plurality of elements, each of the pulse signals varying in level so as to rise the power level of the related element in a rise response characteristic thereof before the power level of the related element completely falls down in accordance with a fall response characteristic thereof; selecting one of the plurality of pulse signals for each of the plurality of elements, depending on the characteristic of the element of concern; and generating a driving signal for each of the plurality of elements from the corresponding selected one of the plurality of pulse signals and corresponding image data, the driving signal being supplied to the corresponding one of the elements. The driving signal changes in accordance with the corresponding pulse signal so that the power level of the related element changes without becoming equal to zero.

The above objects of the present invention can also be achieved by an apparatus for driving a solid scan type recording head having a plurality of elements having a function such as light emission, exothermic and discharge, comprising first means for generating a plurality of pulse signals different from each other in one of a frequency and duty ratio thereof over a fixed time, depending on a difference in characteristics of the plurality of elements, each of the pulse signals varying in level so as to rise the power level of the related element in a rise response characteristic thereof before the power level of the related element completely falls dow in accordance with a fall response characteristic thereof; second means, connected to the first means, for selecting one of the plurality of pulse signals for each of the plurality of elements, depending on the characteristic of the element of concern; and third means, connected to the second means, for generating a driving signal for each of the plurality of elements from the corresponding selected one of the plurality of pulse signals and corresponding image data, the driving signal being supplied to the corresponding one of the elements. The driving signal changes in accordance with the corresponding pulse signal so that the power level of the related element changes without becoming equal to zero.

Other objects, features and advantages of the present invention will become apparent from the following detailed description when read in conjunction with the accompanying drawings.

BRIEF DESCRIPTION OF THE DRAWINGS

FIG. 1 is a view illustrating waveforms of signals for driving corresponding LEDs in accordance with a conventional driving method;

FIGS. 2A and 2B are enlarged views illustrating the principle of the conventional driving method;

FIGS. 3A and 3B are views illustrating the principle of the present invention;

FIGS. 4A and 4B are enlarged views illustrating response characteristics of an element when derived according to the conventional method and the present invention, respectively;

FIG. 5 is a view illustrating an actual recording power;

DESCRIPTION OF THE PREFERRED EMBODIMENTS

Figure 6:
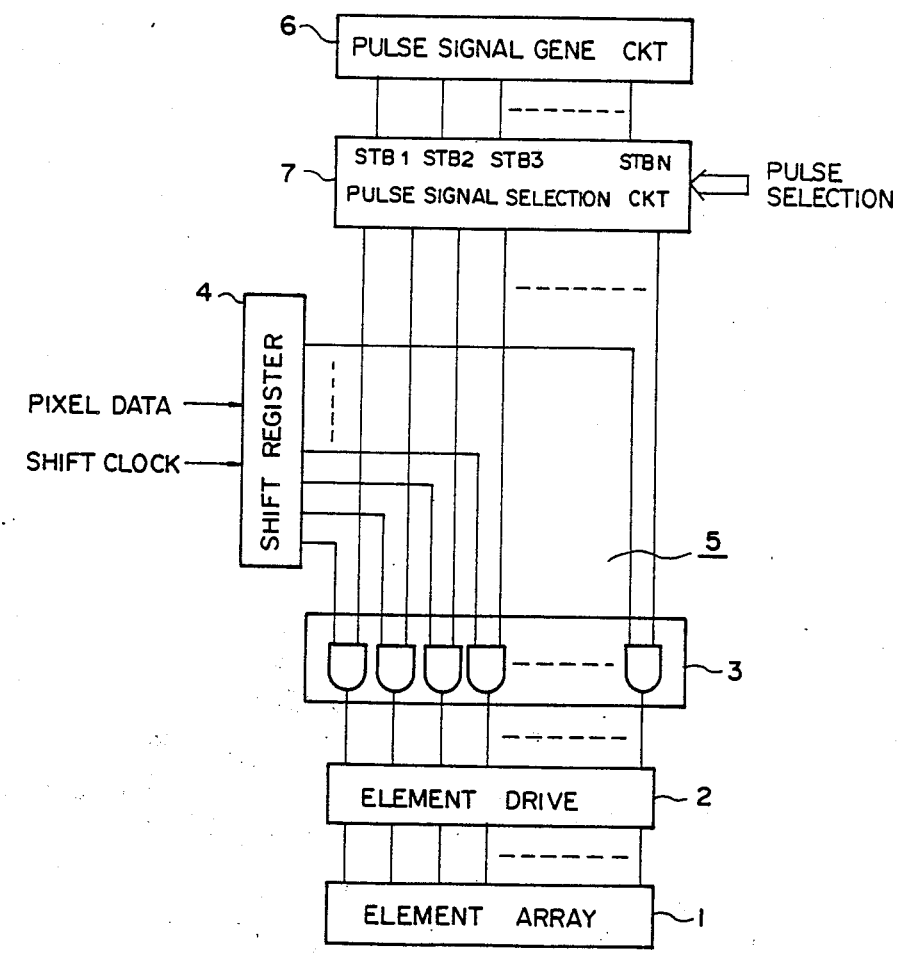
FIG. 6 is a block diagram of a preferred embodiment of the present invention.

A description is given of the principle of a driving method of the present invention with reference to FIGS. 3A and 3B. The present method is based on a driving method in which each element having an emission power level P2 is driven so that the amount of energy Ei used for printing one dot becomes equal to the amount of energy Eo necessary to drive one element having an ideal emission power level Po (Po<Pi) over a fixed time To as shown in FIG.3A. The prior art is also based on the above. According to the present invention, an improvement as shown in FIG.3B is given the above base of the driving method. It is now assumed that the basic driving time for an element having the ideal emission power level Po is also the fixed time To. Over the fixed time To, the element is alternately turned ON and OFF in such an ON/OFF operation that the element is turned OFF before the emission power level of the element of concern becomes equal to the emission power level Pi, and is turned ON again before the emission power level thereof reaches 0. Thereby, the element is provided with emission power which varies in a range of $+P1$ to $-P2$ around the ideal emission power level Po, where $P1 \leq (Pi - Po)$ and $P2 < Po$. The energy Ej over the entire fixed time To is represented as $$Ej = \int_0^{To} p(T)dT$$

where p(T) is emission power as a function of time, which changes between the power levels (Po+P1) and (Po−P2) at a predetermined frequency and predetermined duty ratio. The power function p(T) is determined so that Ej=Eo. Such a power function p(T) can arbitrarily be set by a pulse signal based on a combination of a frequency higher than a sub-scanning frequency and duty ratio thereof. The above will be described in detail liter. A sub-scanning frequency is a frequency of image data in the sub-scanning direction perpendicular to lines (main scanning direction).

It can be seen from comparison between FIG. 1B and 3B that a variation in power distribution obtained by the present invention in one dot is extremely small, and thereby unevenness of the density distribution can be reduced. Particularly, since the recording power never becomes 0 in one dot, the present invention is suitable for recording based on an electrophotographic process. For example, unevenness in amount of adhesive toner in one dot is made extremely small.

The driving of elements based on the power function p(T) as shown in FIG. 3(B) can be achieved by utilizing rise/fall response characteristics of elements. The rise/fall response characteristics are described with reference to FIG. 4A. As is illustrated in FIG. 4A, when turning ON an element having an emission power level Pi at time $t_{ON}$, the emission power of the element increases and then becomes equaltto the emission power level Pi in accordance with a rise response characteristic U thereof. Then the element is kept so as to continuously have the emission power level Pi for a while. Thereafter when the element is turned OFF at time $t_{OFF}$, the emission power level of the element decreases and becomes equal to 0 in accordance with a fall response characteristic D thereof.

According to the present invention, each element having the above-mentioned rise/fall response characteristics is driven as follows. Referring to FIG. 4B, after turning ON the element at time $t_{ON}$, the element is turned OFF at the emission power level (Po+P1) lower than the maximum power level Pi. Thereby, the emission power level of the element decreases from power level (Po+P1) in accordance with the fall response characteristic D. Then when the emission power level of the element becomes equal to emission power level (Po−P2) higher than a power level of 0, the element is turned ON again. Thereby, the emission power of the element increases from the power level (Po−P2)

in accordance with the rise response characteristic U. In this manner, the element is alternatively and repetitively turned ON and OFF.

It is possible to arbitrarily change the emission power between values +P1 and −P2 around the ideal emission power level Po, by suitably selecting ON/OFF timing. The above-mentioned change of emission power corresponds to the shape of waveform of the driving signal supplied to the related element. The ON/OFF timing corresponds to the frequency and duty ratio of the driving signal. It may be said that a pulse signal having a frequency is superimposed on an image pulse signal having a frequency (sub-scanning frequency) lower than the frequency of the pulse signal. Actually, it is preferable to vary the frequency of the pulse signal in a range of 10 kHz to 1 GHz.

FIG. 5 illustrates a waveform of the recording power (emission power) obtained when an element having a power level Pi as large as 1.3 times the ideal power level Po is driven over the fixed time To by a pulse signal having a certain frequency and duty ratio.

In a case where the duty ratio is fixed, amplitudes of high-frequency components, corresponding to the difference between the power levels +P1 and −P2 are decreased and varies more slightly in the vicinity of the ideal power level Po, as the frequency of the pulse signal increases. From this viewpoint, it may be said that each element can be driven in such a state that ripple components are considerably reduced, when the frequency of the pulse signal is set large to some extent. On the other hand, a case is described where the frequency of the pulse signal is fixed and the duty ratio is set variable. The variable control of the duty ratio is possible by preparing a plurality of discrete values of the duty ratio. For example, in the case where the relative power level of an element to the ideal emission power level Pi is assumed to be equal to 1.3, a range between 1.0 and 1.3 is divided into four steps for every 0.75. Then the values of the duty ratio are selected which enable it to be possible to make each of the relative emission power levels 1.3, 1.225, 1.15 and 1.075 set equal to 1.0. Actually, it is preferable to change the duty ratio in a range of 70%–90%. Further, it is preferable that as the emission power level is smaller, a larger duty ratio is selected. In this manner, it becomes possible to obtain the ideal power level Po with the ripple components reduced, by suitably selecting the duty ratio with the frequency set high to some extent.

A description is given of the structure of a driving circuit which implements the above-mentioned method of the present invention with reference to FIG. 6. Referring to FIG. 6, a light emitting element driving circuit (hereafter simply referred to a driver) 2 is provided for an array 1 consisting of light emitting elements such as an LED array and a fluorescent dot array. The driver 2 is driven by output signals of an AND gate circuit 3, which consists of AND gates amounting in number to the light emitting elements arranged in the array 1. Each of the AND gates has two input terminals, one of which is supplied with picture element data (pixel data) supplied from a shift register 4, and the other terminal is connected to a pulse signal selecting circuit 7. The shift register 4 converts pixel data in serial form into pixel data in parallel form by using a shift clock supplied from an external circuit (not shown) such as a central processing unit provided in a printing machine, for example. Each of the parallel pixel data is supplied to the corresponding AND gate arranged in the AND gate circuit 3. The pixel data is output over a time amounting to approximately 90% of the sub-scanning period. The above time corresponds to the aforementioned fixed time To. The AND gate circuit 3 and the shift register 4 construct a driving circuit 5.

The pulse signal selecting circuit 7 selectively outputs one or more N strobe signals STB1 through STBN generated by a pulse signal generating circuit 6, in accordance with a pulse selection signal supplied from the external circuit (not shown) such as the aforementioned CPU. That is, the pulse signal selecting circuit 7 selects one of the strobe signals STB1 through STBN for each of the light emitting elements (or AND gates arranged in the AND gate circuit 3). Each of the strobe signals selected from among the N strobe signals STB1 through STBN is supplied to corresponding one or more AND gates arranged in the AND gate circuit 3. It is noted that the strobe signals STB1 through STBN correspond to N different power functions p(T). The selected strobe signals STB1 through STBN pass through the corresponding AND gates in the AND gate circuit 3 when the corresponding image data are supplied thereto. When the AND gates are held ON, corresponding portions of the driver 2 are held in an enabled state, while held in a disabled state when the AND gates are held OFF. It is noted that each of the strobe signals STB1 through STBN corresponds to the aforementioned pulse signal. For example, the pulse signal selecting circuit 7 operates in such a manner that the strobe signal STB1 is supplied to the first and fourth light emitting elements, and the strobe signal STB2 is supplied to the fifth light-emitting element.

Figure 7:
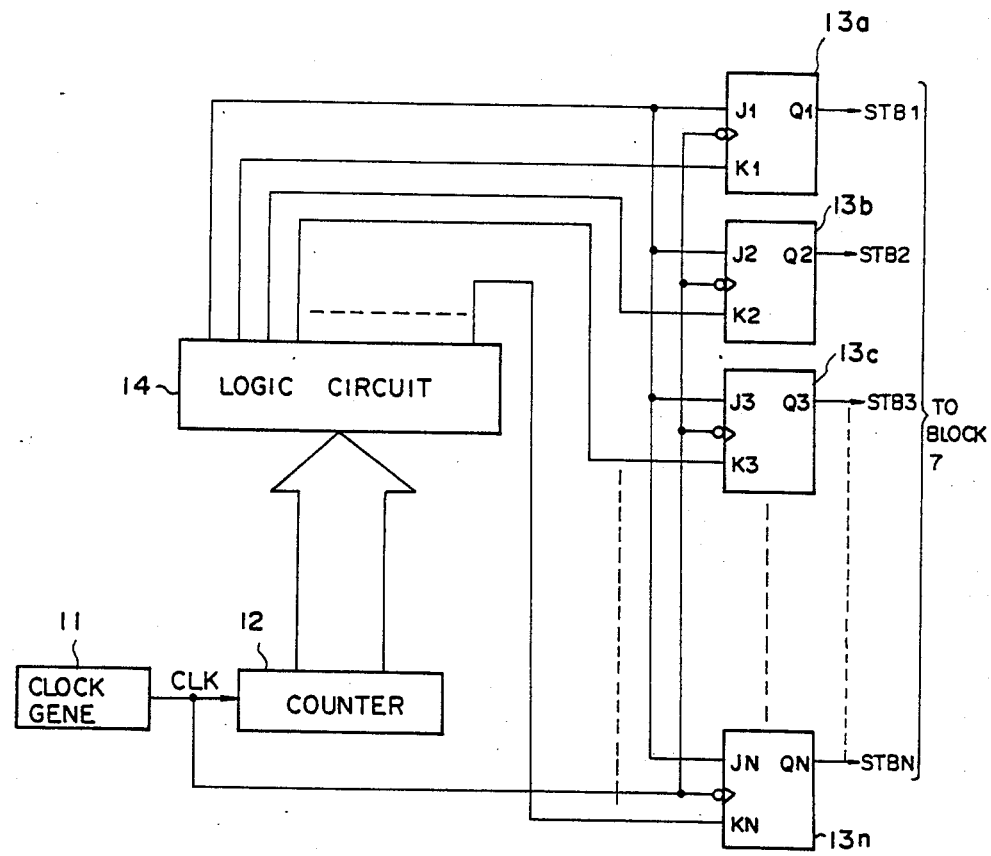
FIG. 7 is a circuit diagram of a variable duty ratio type pulse signal generating circuit which may used in the embodiment of FIG. 6.

FIG. 7 is a circuit diagram of an example of the structure for the pulse signal generating circuit 6, which is of the variable duty ratio type. The illustrated circuit is made up of a counter 12, N number of J-K flip-flops 13a through 13n, and a logic circuit 14. The counter 12 counts a clock signal CLK of a period $t_0$, which is generated by a clock generator 11. The counter 12 is initialized when counting the clock signal CLK by a time T, which is selected depending on frequency of the pulse signal. Each time the counter 12 is initialized, the logic circuit 14 sets the J-input terminals of the flip-flops 13a through 13n to a high level (hereafter simply referred to H level). Then, the strobe signals STB1 through STBN supplied from the flip-flops 13a through 13n rise (or fall) in synchronism with the rise of the clock signal CLK. Then, the strobe signal STB1 falls (or rises) when the counter 12 counts the clock signal CLK by a time T1 ($=n_1 \times t_0$) after initialized and thereby a K1 terminal of the flip-flop 13a is supplied with a signal held at H level from the logic circuit 14. Similarly, when the counter 12 counts the clock signal CLK by a time T2 ($=n_2 \times t_0$) after initialized, a K2 terminal of the flip-flop 13b is supplied with a signal held at H level from the logic circuit 14, and the strobe signal STB2 supplied from the flip-flop 13b falls (rises). In this manner, when the counter 12 counts the clock signal CLK by times T3 ($=n_3 \times t_0$), . . . , TN ($=n_N \times t_0$), the strobe signals derived from the flip-flops 13c through 13N fall (or rise) at the respective times. In this manner, values of the duty ratio of the strobe signals STB1 through STBN, D1, D2, . . . , DN can be determined as follows: D1=(T1/T)×100%, D2=(T2/T)×100%, . . . , DN=(TN/T)×100%.

FIG. 7 is a timing chart of the strobe signals STB1 through STB4 where N=4. By using a plurality of strobe signals and selecting one or more suitable strobe signals among from them, it is possible to obtain the operation as described with reference to FIGS. 3A through 5.

Figure 8:
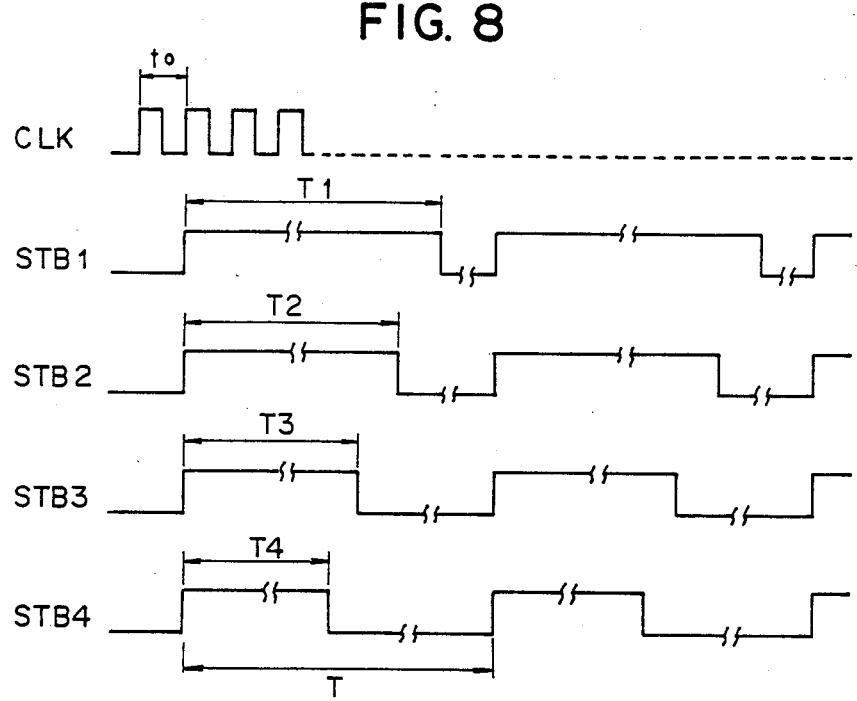
FIG. 8 is a timing chart of signals at different parts in the circuit of FIG. 7.
Figure 9:
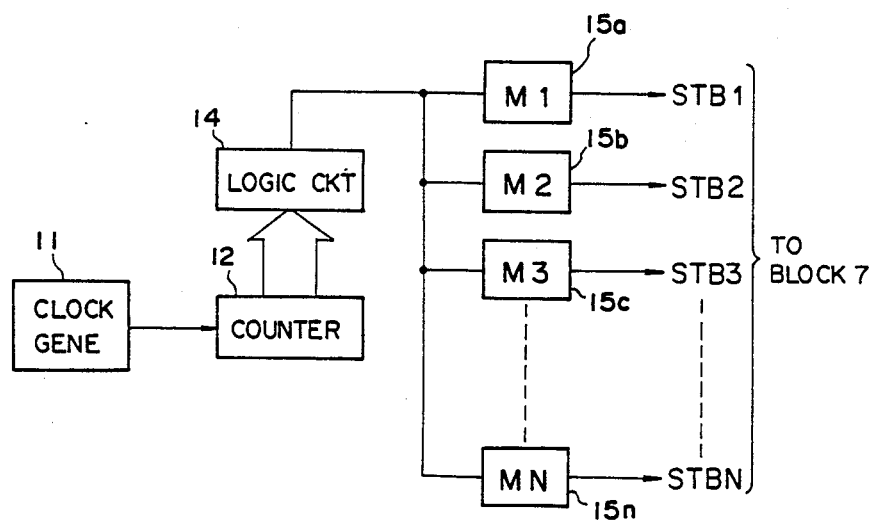
FIG. 9 is a circuit diagram of a variation of the variable duty ratio type pulse signal generating circuit which may used in the embodiment of FIG. 6.

The pulse signal generating circuit 6 of the variable duty ratio type may be replaced with a configuration shown in FIG. 9, in which those parts which are the same as those in FIG. 7 are given the same reference numerals. As is illustrated in FIG. 9, monostable multivibrators 15a through 15n are substituted for the J-K flip-flops 13a through 13n shown in FIG. 7. The n monostable multivibrators 15a through 15n output signals having corresponding pulse durations (widths) T1, T2, ..., TN. In this case, the logic circuit 14 is designed to simply pass through the output signals of the counter 12 as shown in FIG. 8.

Figure 10:
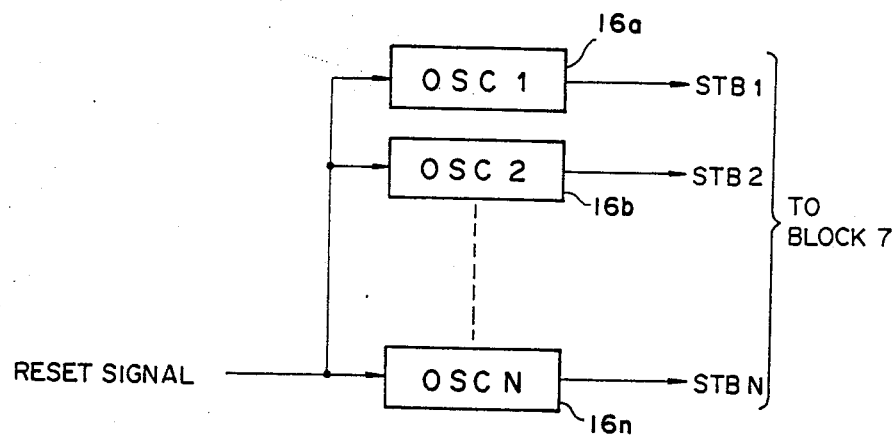
FIG. 10 is a circuit diagram of a variable frequency type pulse signal generating circuit which may be used in the embodiment of FIG. 6.
Figure 11:
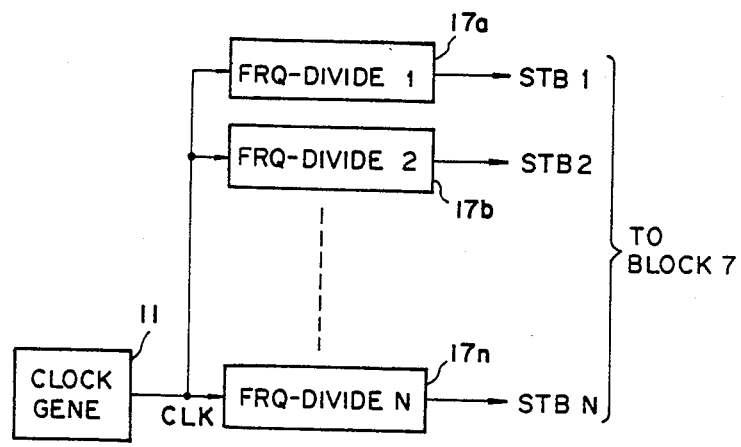
FIG. 11 is a circuit diagram of a variation of the variable frequency type pulse signal generating circuit.

On the other hand, in the case where the pulse signal generating circuit 6 is used as the variable frequency type, it is constructed as shown in FIG. 10 or 11. Referring to FIG. 10, the pulse signal generating circuit 6 includes oscillators 16a through 16n, which generate no output signals during a time when reset by the reset signal, which may be generated as in the case of the circuit shown in FIG. 9. After the oscillators 16a through 16n are released from the reset state, the oscillators 16a through 16n generate the strobe signals STB1 through STBN, respectively.

Referring to FIG. 11, the pulse signal generating circuit 6 includes the clock generator 11, and frequency dividers 17a through 17n. The frequency dividers 17a through 17n frequency-divide the clock signal CLK at corresponding the frequency division ratios, and then output the strobe signals STB1 through STBN.

In the aforementioned embodiments of the present invention, each pulse signal is controlled for every one bit. In the alternative, it is possible to control the pulse signals for every 64 bits, 128 bits and 256 bits. In other words, it is possible to control the pulse signals for each IC chip. For example, all the AND gates arranged in the AND gate circuit 3 is supplied in common with selected one of the strobe signals STN1 through STBN. In such a case, it is desired that light emitting elements arranged in each IC chip have almost identical light emission power levels. In other words, if light emitting elements arranged in an IC chip do not have almost identical light emission power levels, it is preferable to individually control light emitting elements.

As described previously with reference to FIGS. 3A through FIG. 5, each element is turned OFF with a timing corresponding to the emission power level (Po+P1) lower than the emission power level Pi thereof. In the alternative, an element may be turned OFF with a timing corresponding to the emission power level Pi.

It is noted that it is easy for those skilled in the art to construct the structure of the the pulse selection circuit 7 so as to implement the selection operation based on the essential features of the present invention. Similarly, it is ease for those skilled in the art to construct the logic circuit 14 so as to control the flip-flops 13a through 13n and the monostable multivibrators 15a through 15n in the aforementioned way based on the essential features of the present invention.

The present invention is not limited to the aforementioned embodiments, and variations and modifications may be made without departing from the scope of the present invention.

What is claimed is:

1. A method for driving a solid scan type recording head having a plurality of elements having a function such as light emission, exothermic and discharge, comprising the steps of:
    generating a plurality of pulse signals different from each other in one of a frequency and duty ratio thereof over a fixed time, depending on a difference in characteristics of said plurality of elements, each of said pulse signals varying in level so as to rise the power level of the related element in a rise response characteristic thereof before the power level of said related element completely falls to a predetermined lowest power level in accordance with a fall response characteristic thereof;
    selecting one of said plurality of pulse signals for each of said plurality of elements, depending on the characteristic of the element of concern; and
    generating a driving signal for each of said plurality of elements from the corresponding selected one of said plurality of pulse signals and corresponding image data, said driving signal being supplied to the corresponding one of said elements,
    said driving signal changing in accordance with the corresponding pulse signal so that the power level of the related element changes without becoming equal to said predetermined lowest power level over said fixed time.

2. A method as claimed in claim 1, wherein each of said plurality of pulse signals alternately and repetitively rises and falls the power level of the related element in a range between a first power level and a second power level, said range containing an ideal power level of the element of concern.

3. A method as claimed in claim 2, wherein said first power level is equal to or lower than a maximum power level of the element of concern and larger than said ideal power level.

4. A method as claimed in claim 2, wherein said predetermined lowest power level is equal to zero, and wherein said second power level is not equal to zero and lower than said ideal power level.

5. A method as claimed in claim 1, wherein said frequency of each of said plurality of pulse signals is higher than a frequency of said image data.

6. A method as claimed in claim 1, wherein said selected one of said plurality of pulse signals is supplied in common to a group consisting of said elements.

7. An apparatus for driving a solid scan type recording head having a plurality of elements having a function such as light emission, exothermic and discharge, comprising:
    first means for generating a plurality of pulse signals different from each other in one of a frequency and duty ratio thereof over a fixed time, depending on a difference in characteristics of said plurality of elements, each of said pulse signals varying in level so as to rise the power level of the related element in a rise response characteristic thereof before the power level of said related element completely falls to a predetermined lowest power level in accordance with a fall response characteristic thereof;
    second means, connected to said first means, for selecting one of said plurality of pulse signals for each of said plurality of elements, depending on the characteristic of the element of concern; and
    third means, connected to said second means, for generating a driving signal for each of said plurality of elements from the corresponding selected one of said plurality of pulse signals and corresponding image data, said driving signal being supplied to the corresponding one of said elements, said driving signal changing in accordance with the corresponding pulse signal so that the power level of the related element changes without becoming equal to said predetermined lowest power level.

8. An apparatus as claimed in claim 7, wherein said first means comprises;
    clock generating means for generating a series of clock pulses;
    counter means for counting said clock pulses generated by said clock generating means, and outputting the counted value;
    a plurality of flip-flop means each for outputting the corresponding one of said plurality of pulse signals; and
    logic means, connected to said counter means and said plurality of flip-flop means, for generating first control signals used for setting, at the same time, all the plurality of flip-flop means from said counted value supplied from said counter means and second control signals used for separately resetting said plurality of flip-flop means from said counted value supplied from said counter means,
    the duty ratio of said plurality of pulse signals being different from each other, the frequency of said plurality of pulse signals being identical to each other.

9. An apparatus as claimed in claim 8, wherein said logic means generates said first control signals when said counter means counts a predetermined number of said clock pulses corresponding to said fixed time, and generates said second control signals for resetting said corresponding flip-flop means, when said counter means counts said clock pulses by a predetermined number of clock pulses selected individually for each of said plurality of flip-flop means.

10. An apparatus as claimed in claim 9 wherein each of said flip-flop means comprises a JK type flip-flop having a J-terminal supplied with the corresponding first control signal, and a K-terminal supplied with the corresponding second control signal.

11. An apparatus as claimed in claim 7, wherein said first means comprises:
    clock generating means for generating a series of clock pulses;
    counter means for counting said clock pulses generated by said clock generating means by a predetermined number of pulses;
    a plurality of monostable multivibrator means each for outputting the corresponding one of said plurality of pulse signals; and
    logic means, connected to said counter means and said plurality of monostable multivibrator means, for generating a control signal supplied to all the plurality of said monostable multivibrator means when said counter means counts said predetermined number of clock pulses,
    wherein when said control signal is simultaneously supplied to all the plurality of said monostable multivibrator means, said plurality of monostable multivibrator means are activated, and then output the corresponding pulse signals, so that the duty ratio of said plurality of pulse signals is different from each other, and the frequency of said plurality of pulse signals is identical to each other.

12. An apparatus as claimed in claim 7, wherein said first means comprises oscillator means for generating a plurality of pulse signals having mutually different frequencies and an identical fixed duty ratio, said plurality of pulse signals generated by said oscillator means being said plurality of pulse signals supplied to said second means.

13. An apparatus as claimed in claim 12, wherein said oscillator means is reset for every said fixed time.

14. An apparatus as claimed in claim 7, wherein said first means comprises clock generating means for generating a clock signal, and a plurality of frequency-dividing means each for dividing said clock signal supplied from said clock generating means at a predetermined frequency-dividing ratio defined for each of said frequency-dividing means, oscillator means for generating a plurality of pulse signals having mutually different frequencies and an identical fixed duty ratio, thereby outputting said corresponding pulse signals.

15. An apparatus as claimed in claim 7, wherein each of said plurality of pulse signals alternately and repetitively rises and falls the power level of the related element in a range between a first power level and a second power level, said range containing an ideal power level of the element of concern.

16. An apparatus as claimed in claim 7, wherein said first power level is equal to or lower than a maximum power level of the element of concern and larger than said ideal power level.

17. An apparatus as claimed in claim 7, wherein said predetermined lowest power level is equal to zero, and wherein said second power level is not equal to zero and lower than said ideal power level.

18. An apparatus as claimed in claim 7, wherein said frequency of each of said plurality of pulse signals is higher than a frequency of said image data.

19. An apparatus as claimed in claim 7, wherein said selected one of said plurality of pulse signals is supplied in common to a group consisting of said elements.

20. An apparatus as claimed in claim 7, wherein said third means comprises:
    AND gates provided for said plurality of elements, and each of said AND gate has a first input terminal provided with the corresponding selected one of the pulse signals generated by said first means, a second input terminal provided with the corresponding image data, and an output terminal through which the result of an AND operation is outputted; and
    driving means connected to sad output terminal of each of said AND gates, for amplifying the results of the AND operation executed in the AND gates so as to generate said said driving signal to be supplied to s id plurality of elements.

* * * * *